(12) United States Patent
Chow

(10) Patent No.: US 9,713,841 B2
(45) Date of Patent: Jul. 25, 2017

(54) SEGMENTED DIE CASTING BLOCK

(71) Applicant: Pratt & Whitney Services PTE LTD., Singapore (SG)

(72) Inventor: Wai Tuck Chow, Singapore (SG)

(73) Assignee: PRATT & WHITNEY SERVICES PTE LTD., Singapore (SG)

(*) Notice: Subject to any disclaimer, the term of this patent is extended or adjusted under 35 U.S.C. 154(b) by 0 days.

(21) Appl. No.: 14/782,087

(22) PCT Filed: Mar. 12, 2014

(86) PCT No.: PCT/SG2014/000118
§ 371 (c)(1),
(2) Date: Oct. 2, 2015

(87) PCT Pub. No.: WO2014/163585
PCT Pub. Date: Oct. 9, 2014

(65) Prior Publication Data
US 2016/0039000 A1  Feb. 11, 2016

(30) Foreign Application Priority Data
Apr. 3, 2013 (SG) .................. 201302505

(51) Int. Cl.
B22D 17/22 (2006.01)
B23P 6/00 (2006.01)
(52) U.S. Cl.
CPC ........... *B22D 17/22* (2013.01); *B22D 17/229* (2013.01); *B22D 17/2209* (2013.01); *B22D 17/2227* (2013.01); *B23P 6/00* (2013.01)

(58) Field of Classification Search
CPC .. B22D 17/229; B22D 17/22; B22D 17/2227; B22D 17/2209
See application file for complete search history.

(56) References Cited

U.S. PATENT DOCUMENTS

| 2,274,060 A | * | 2/1942 | Hart .................. A43D 3/02 12/142 R |
| 3,431,601 A | * | 3/1969 | Lipscomb ............... B22C 7/005 249/117 |
| 4,284,124 A |   | 8/1981 | Komatsu et al. |
| 4,566,523 A | * | 1/1986 | Vaubel ............... B22D 11/0403 164/420 |

(Continued)

FOREIGN PATENT DOCUMENTS

DE  102005024768  11/2006
GB  2067441  7/1981
(Continued)

OTHER PUBLICATIONS

Extended European Search Report for Application No. 14779363.2 dated Mar. 30, 2016.
(Continued)

Primary Examiner — Kevin P Kerns
Assistant Examiner — Steven Ha
(74) Attorney, Agent, or Firm — Carlson, Gaskey & Olds, P.C.

(57) ABSTRACT

A die casting assembly has a cavity defined by multiple dies, the cavity includes at least one sharp corner. Each of the dies includes multiple die segments. A die segment joint between at least two of the die segments is aligned with the sharp corner.

16 Claims, 5 Drawing Sheets

(56) References Cited

U.S. PATENT DOCUMENTS

| | | | |
|---|---|---|---|
| 4,832,110 A | | 5/1989 | Perrella et al. |
| 5,163,501 A | | 11/1992 | Tanaka et al. |
| 5,505,246 A | * | 4/1996 | Colvin ................. B22D 27/003 164/158 |
| 2009/0160091 A1 | | 6/2009 | Zhu et al. |

FOREIGN PATENT DOCUMENTS

| | | |
|---|---|---|
| JP | 07-032120 | 2/1995 |
| JP | 2008142734 | 6/2008 |
| KR | 10-2012-0115820 | 10/2012 |

OTHER PUBLICATIONS

International Search Report and Written Opinion for International Application No. PCT/SG2014/000118 mailed Jun. 18, 2014.
Singapore Examination and Search Report for Singapore Application No. 201302505-1 dated Feb. 14, 2014.

* cited by examiner

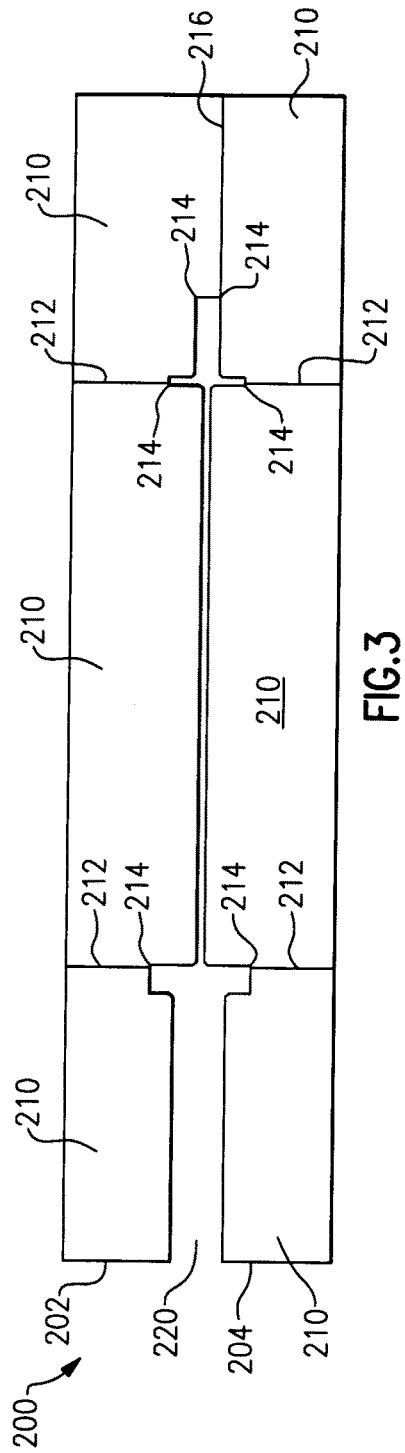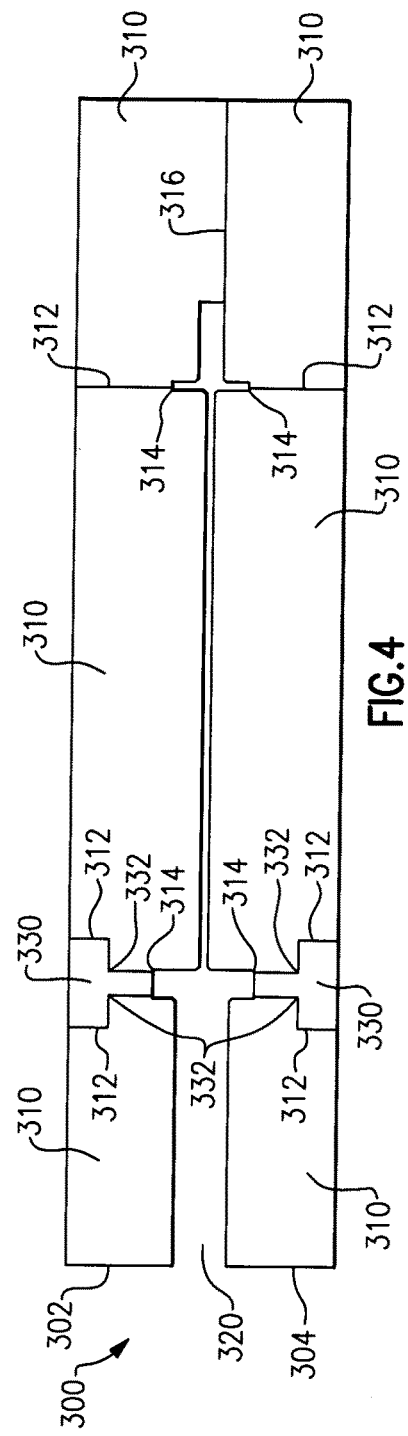

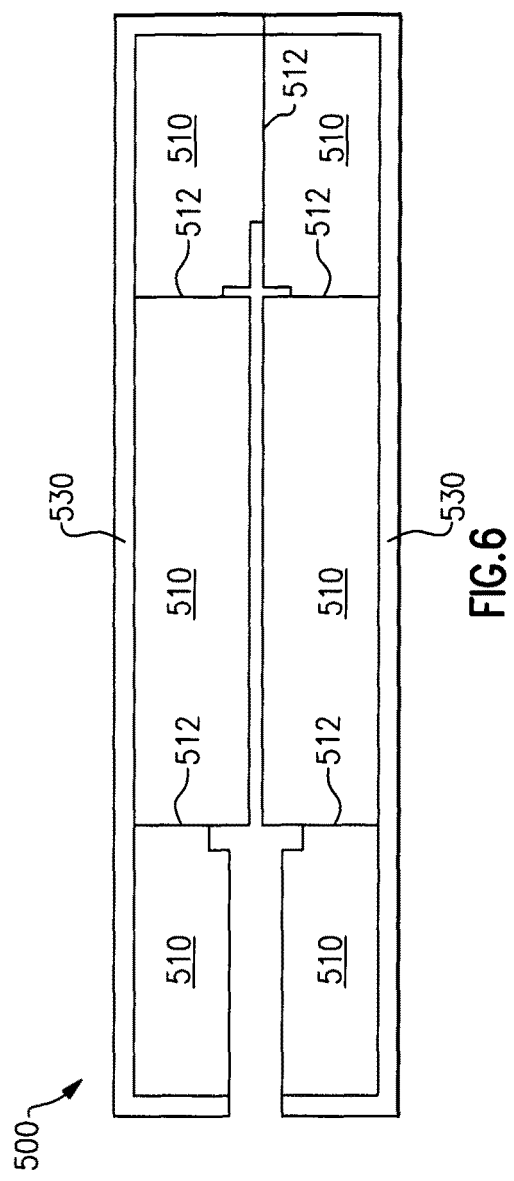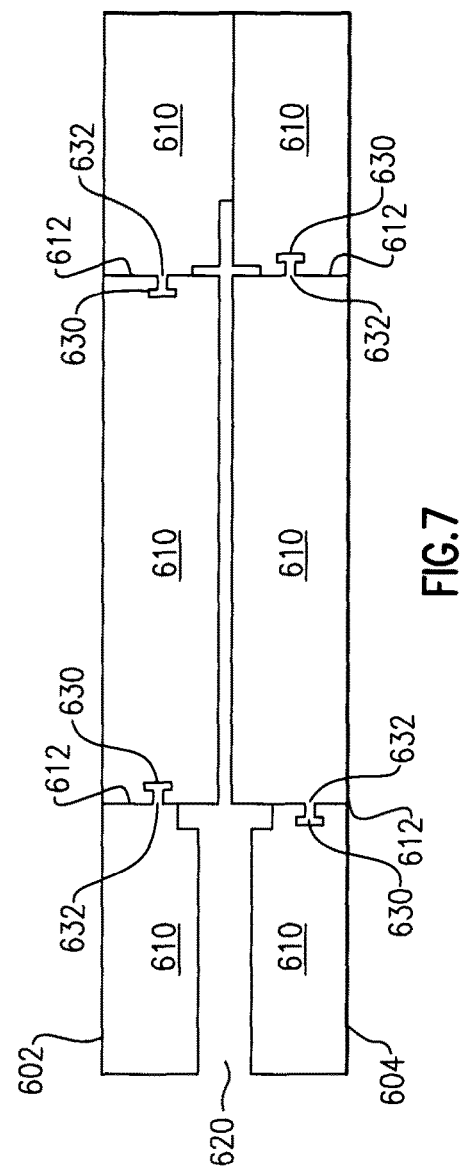

SEGMENTED DIE CASTING BLOCK

TECHNICAL FIELD

The present disclosure relates generally to die casting molds, and more particularly to a segmented die assembly for the same.

BACKGROUND OF THE INVENTION

Many jet engine components, such as airfoil parts, are cast as a whole part using a die casting technique. Due to the unique geometries of the aircraft components, the die cavity is imprinted with many sharp corners (corners having an angle of less than or equal to 110 degrees) and deep grooves. The sharp corners and deep grooves create high thermal stress locations on the die cavity block. Fatigue cracks can more easily form at the high stress locations, resulting in accelerated wear and damage to the cavity block.

The accelerated wear requires the dies forming the die cavity to be replaced frequently, thereby increasing the costs associated with die casting aircraft parts. Further exacerbating the elevated thermal wear at the high stress locations is the fact that many aircraft components are cast from materials that must be cast at extremely high temperatures, such as nickel alloy. The temperatures these materials are cast at are particularly high when considered relative to a standard die casting material such as aluminum, which can be cast at approximately 1200 degrees F. (648.89 degrees C.). As a result of the deep grooves and sharp curves, manufacturing the dies out of materials suitable for extreme heat casting can also be prohibitively expensive.

SUMMARY OF THE INVENTION

A die casting assembly according to an exemplary embodiment of this disclosure, among other possible things includes a cavity defined by a plurality of dies, the cavity includes at least one sharp corner, each of the dies including a plurality of die segments, each of the die segments contacting at least one other of the plurality of die segments, and a first die segment joint between at least two of the die segments, the die segment joint is aligned with the sharp corner.

In a further embodiment of the foregoing die casting assembly, at least one sharp corner is a plurality of sharp corners.

In a further embodiment of the foregoing die casting assembly, including a plurality of die segment joints, each of the die segment joints aligned with at least one of the sharp corners.

In a further embodiment of the foregoing die casting assembly, at least one of the plurality of die segments is at least partially coated via a pack cementation or plasma vapor deposition process.

In a further embodiment of the foregoing die casting assembly, at least one of the plurality of die segments is at least partially coated via a pack cementation or plasma vapor deposition process.

In a further embodiment of the foregoing die casting assembly, at least one of the die segments is maintained in position in the die via a pair of opposing spring features.

In a further embodiment of the foregoing die casting assembly, at least one of the die segments is maintained in position in a housing at least partially surrounding the plurality of die segments.

In a further embodiment of the foregoing die casting assembly, each of the plurality of die segments includes a connector corresponding to each contacting die segment, and each of the connectors is interfaced with a corresponding connector of a contacting die segment.

In a further embodiment of the foregoing die casting assembly, a joint connecting a first die segment and a second die segment comprises a sharp corner.

A die according to an exemplary embodiment of this disclosure, among other possible things includes a plurality of die segments, each of the die segments contacting at least one other of the plurality of die segments, and a partial die cavity defined by the die segments, the partial die cavity includes at least one sharp corner, a first die segment joint between at least two of the die segments, the die segment joint is aligned with the sharp corner.

In a further embodiment of the foregoing die, at least one sharp corner includes at least two sharp corners, and at least one half of the sharp corners are aligned with at least one die segment joint.

In a further embodiment of the foregoing die, at least one of the die segment joints includes a corner spaced apart from the die cavity.

In a further embodiment of the foregoing die, each of the plurality of die segments is constructed of a material selected from a group of steel, superalloy, refractory metal and ceramic material.

In a further embodiment of the foregoing die, each of the plurality of die segments is at least partially coated via a pack cementation or plasma vapor deposition process.

In a further embodiment of the foregoing die, each of the die segments is maintained in position in the die via a pair of opposing spring features.

In a further embodiment of the foregoing die, each of the die segments is maintained in position in a housing at least partially surrounding the plurality of die segments.

In a further embodiment of the foregoing die, each of the plurality of die segments includes a connector corresponding to each contacting die segment, and each of the connectors is interfaced with a corresponding connector of a contacting die segment.

In a further embodiment of the foregoing die, the sharp corner is a corner having an angle of less than or equal to 110 degrees.

A method according to an exemplary embodiment of this disclosure, among other possible things includes the step of replacing the damaged die segment with a new die segment having a substantially identical geometry to an original geometry of the damage die segment further comprises removing only the damaged die segment from a die containing the damaged die casting segment.

In a further embodiment of the foregoing die, the step of replacing the damaged die segment with a new die segment having a substantially identical geometry to an original geometry of the damage die segment further comprises removing only the damaged die segment from a die containing the damaged die casting segment.

These and other features of the present invention can be best understood from the following specification and drawings, the following of which is a brief description.

BRIEF DESCRIPTION OF THE DRAWINGS

FIG. 3 schematically illustrates a cross section of a first example die cavity block.

FIG. 4 schematically illustrates a cross section of a second example die cavity block.

FIG. 6 schematically illustrates a cross section of a die cavity block including a second example die segment retention feature.

FIG. 7 schematically illustrates a cross section of a die cavity block including a third example die segment retention feature.

DETAILED DESCRIPTION OF AN EMBODIMENT

Figure 1:
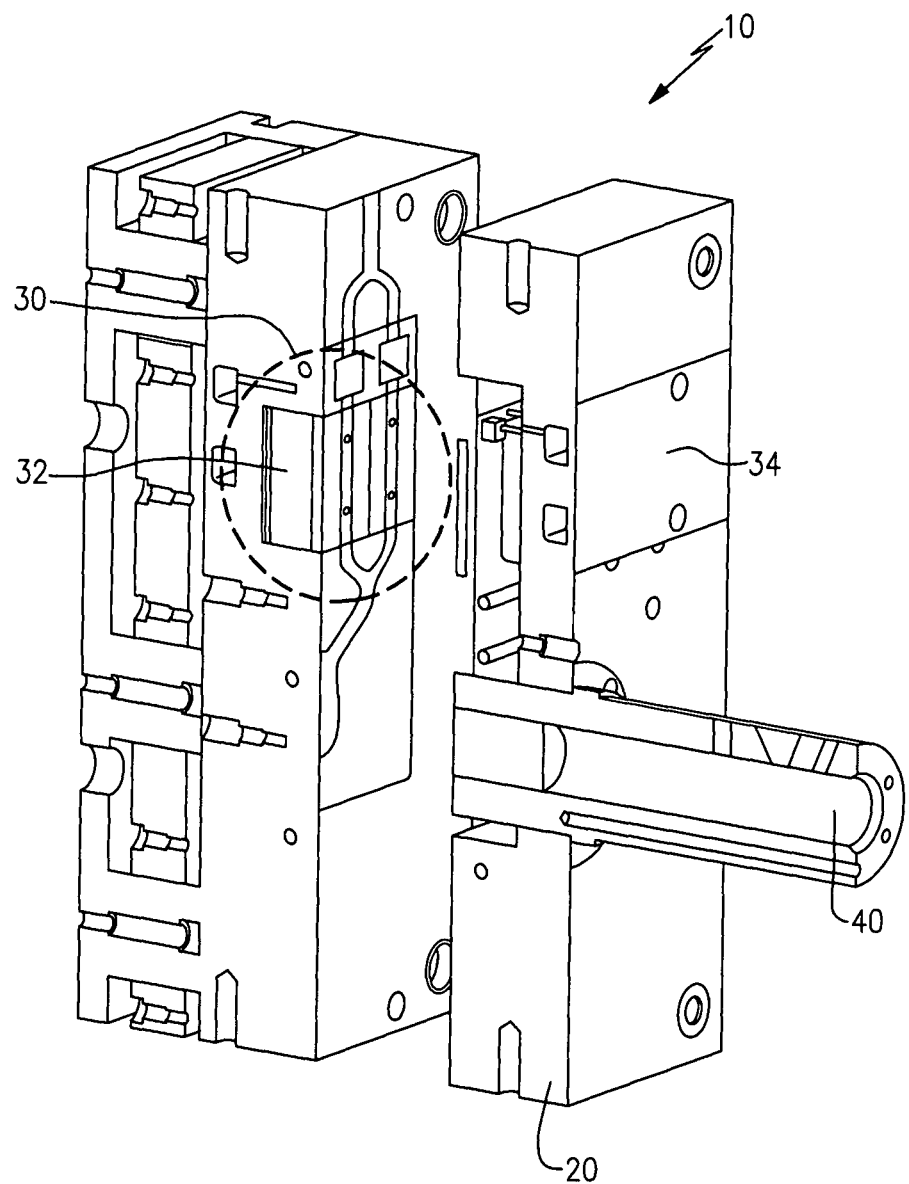
FIG. 1 schematically illustrates a die casting assembly.

FIG. 1 schematically illustrates a general die casting assembly 10. Two dies 32, 34 are used in die casting. One die 34 is a cover die and the other die 32 is an ejector die. The location where the cover die 34 and the ejector die 32 meet is referred to as a parting line. The cover die 34 contains a sprue 40. The sprue 40 allows molten metal to flow into the dies 32, 34 filling a cavity defined by the cover die 34 and the ejector die 32. The ejector die 32 contains ejector pins for ejecting the die cast part from the ejector die 32. The cover die 34 is secured to a stationary, or front, plate of the die casting assembly 10, while the ejector die 32 is attached to a movable plate.

The dies 32, 34 are designed such that the finished casting (the die cast part) will slide off the die cover half 34 and stay in the die ejector half 32 as the dies 32, 34 are opened. The ejector pins located in the ejector half of the die casting assembly 10 eject the die cast part from the die ejector 32 and are driven by an ejector pin plate. The ejector pin plate drives all of the ejector pins at the same time and with the same force, thereby preventing damage to the die cast part.

Figure 2:
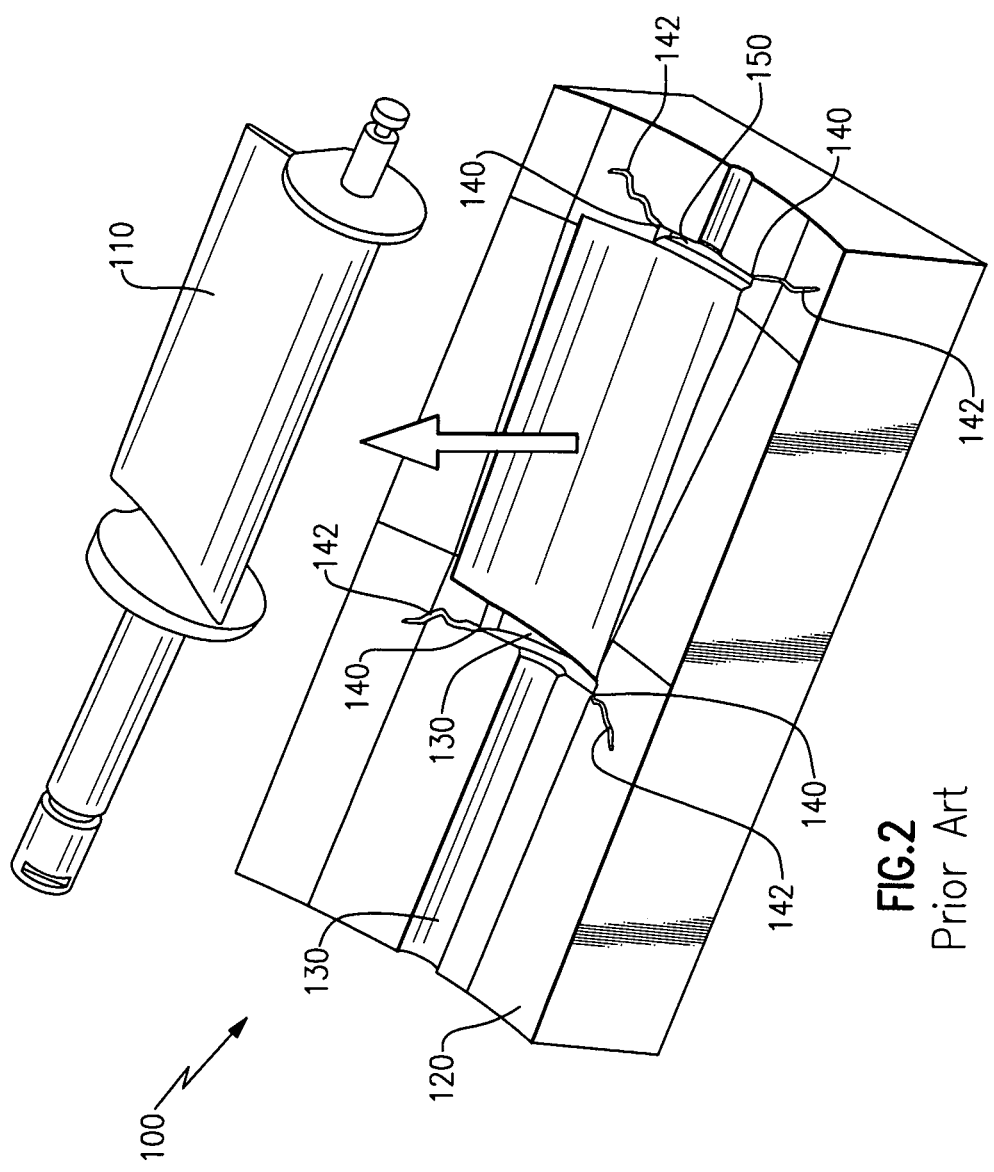
FIG. 2 schematically illustrates an example part geometry and an ejector die half of an example die cavity block.

FIG. 2 schematically illustrates an example part 110 and a corresponding example die 120 for one half of a die cavity block, such as is used in the die casting assembly 10 illustrated in FIG. 1. The geometry of the part 110 imparts a shaped indentation 130 in the die 120. A corresponding second die (not pictured) is placed on top of the part 110, and similarly receives a corresponding shaped indentation. As a result, when the two dies 120 are combined, a die cavity having the geometry of the part 110 is formed. Due to the particularly geometry of the part 110, deep grooves with sharp corners 140 are created in the dies 110. While the illustrated part 110 is only an example geometry, and is simplified for explanatory purposes, it is understood that a practical implementation would have similar grooves and sharp corners. A sharp corner is a corner having an angle of less than or equal to one hundred and ten (110) degrees.

When each die 110 is constructed of a single piece, as in the prior art, high thermal stress regions are formed at the sharp corners 140 as a result of thermal expansion and contraction. The magnitude of stresses placed on the sharp corners 140 is worsened as a result of the extremely high temperatures used in casting aircraft components. Over repeated use, the high stress regions at the sharp corners 140 form stress fractures 142 (alternately referred to as fatigue cracks). The stress fractures 142 eventually become severe enough that the die 120 must be replaced. Thus, a limiting factor on the lifetime of a single piece die 120 is the number of uses before the sharp corners 140 develop stress fractures.

In addition to the sharp corners 140, the part 110 imports deep, narrow grooves 150 in the dies 120. The deep, narrow grooves 150 are difficult and expensive to machine. In addition, it is difficult to coat the deep narrow grooves with a process, such as pack cementation or plasma vapor deposition, that aids the wear and oxidation resistance of the die.

FIG. 3 schematically illustrates an example segmented die assembly 200, where each of the dies 202, 204 is composed of multiple die segments 210. Each of the dies 202, 204 contact the other die 210 along a parting line 216, and define a die cavity 220 between the dies 202, 204. The die cavity 220 is in the geometric shape of the desired part and includes multiple sharp corners 214 as described above.

In order to reduce the high thermal stresses placed on the sharp corners 214, each of the dies 202, 204 is separated into three die segments 210. Each die segment 210 contacts at least one of the other die segments 210 within the same die 202, 204 at a joint line 212. The die segments 210 are maintained in position against each other such that the joint lines 212 do not separate at any point during the casting process. By locating a joint line 212 at each of multiple high stress corners 214, the high thermal stresses associated with each of the sharp corners 214 are relieved by allowing for thermal expansion and contraction at the sharp corner 214. The particular sharp corners 214 connected to the joint lines 212 are determined based on an analysis of the die cavity 220 shape, and are designed to ensure that each of the highest stress corners 214 is connected to a joint line 212. Each of the die segments 210 is a fully independent die component, and can be replaced without requiring the entire die 202, 204 to be replaced.

In addition to reducing the wear at the sharp corners 214 of the die cavity 220, the segmented design of the die 202, 204 introduces the ability to cost effectively manufacture and machine the die segments 210 out of a wider range of materials, and include a wider range of material coatings on the die segments 210. In one example, the die cavity surface of one or more of the die segments 210 is constructed of a refractory metal material with an aluminum oxide coating. In another example, one or more of the die segments 210 is constructed of a ceramic material. The use of the wider range of materials for the die segments 210 improves the thermal wear tolerances of the dies. As a result of the higher thermal wear tolerances, materials requiring a higher heat for the casting process, such as nickel alloy materials, titanium alloys, and steel alloys can be cost effectively used thereby allowing the die casting process to be utilized cost effectively to create parts which require the use of the high heat materials. By way of example, the parts can be automotive, aircraft, or medical parts.

FIG. 4 illustrates a pair of alternate configuration dies 302, 304 for the example part 110, illustrated in FIG. 2. As with the example of FIG. 3, the pair of dies 302, 304 each include multiple die segments 310, 330 and each die segment 310, 330 contacts at least one adjacent die segment 310, 330. The die segments 310, 330 combine to define a die cast cavity 320. During the standard die casting process, it is possible for flashing to occur on the cast part. Flashing is a thin membrane of cast material extending away from the die cast part along one of the joint lines 312 or the parting line 316. Flashing occurs when the dies 302, 304 or die segments 310 are not fully sealed against the adjacent die 302, 304 or die segment 310, and molten cast material fills the gap resulting from the improper seal.

Each die 302, 304 includes at least one a T-shaped die segment 330. The T-shaped die segments 330 introduce a corner in the joint line 312 where the die segment 330 contacts adjacent die segments 310. The corner 332 in the joint line 312 acts as a flashing barrier, and minimizes potential flashing by blocking flashing from extending along the joint line 312 past the corner 332. While the illustrated example of FIG. 3 utilizes a T-shaped die segment 330 at a single point in each of the dies 302, 304, it is understood that additional T-shaped die segments 330 could be included in additional locations depending on the particular geometry of the cavity 320. It is further understood that alternate joint line 312 shapes beyond those created by a T-shaped die segment 330 can include corners 332, thereby achieving the same flashing minimization affect.

With reference to FIGS. 3 and 4, inclusion of multiple die segments 210, 310 allow each of the dies 202, 204, 302, 304 to be partially replaced as the die segments 210, 310, 330 wear out. When any given die segment 210, 310, 330 wears out, the die segment 210, 310, 330 is removed from the die assembly 200, 300, and replaced with an identical new die segment 210, 310, 330. Thus, using the segmented dies 202, 204, 302, 304 increases the longevity of each die 202, 204, 302, 304 and reduces the lifetime costs associated with high temperature dies.

Figure 5:
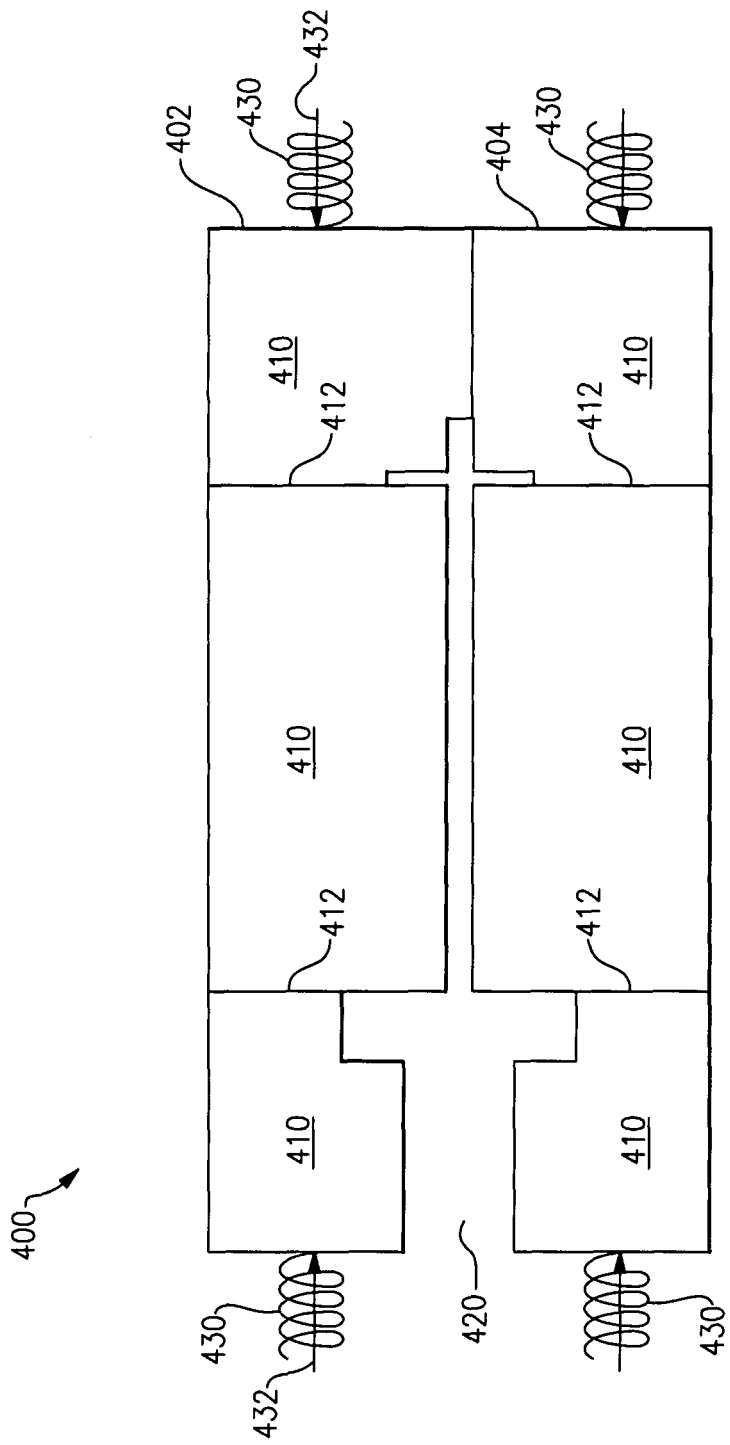
FIG. 5 schematically illustrates a cross section of a die cavity block including a first example die segment retention feature.

In practical applications, a retention feature is used to maintain each of the die segments of a segmented die in contact with each other. FIG. 5 schematically illustrates a first example assembly for maintaining each die segment 410 in contact with the adjacent die segments in a segmented die 402, 404 for a die casting assembly. In the example of FIG. 5, a spring loading component 430 is placed on each end of the die 402, 404. The spring loading components 430 load the die segments 410 along force lines 432. The loading forces 432 applied by the spring loading components 430 are directly opposed to each other, thereby preventing shifting of the die segments 410.

Referring now to FIG. 6, an alternate arrangement for maintaining the die segments 510 in contact with each other is schematically illustrated. In the example of FIG. 6, each of the die segments 510 is contained within a tight fitting housing 530. In some examples, the die segments 510 are press fit within the tight fitting housing 530. In other examples, the die segments 510 can be maintained within the housing 530 using a die segment retention feature built into the housing 530.

Referring now to FIG. 7, an alternate arrangement for maintaining the position of die segments 610 within a segmented die 602, 604 is illustrated. Each of the segmented dies 610 includes a connection feature 630 at a joint line 612. The connection features interface with a corresponding connection feature 632 on an adjacent die segment 610. In a practical application, each of the die segments 610 of a given die 602, 604 are interfaced prior to installation in the die casting assembly 10 (illustrated in FIG. 1). Similarly, the die 602, 604 is fully removed from the die casting assembly 10 when one of the die segments 610 is replaced. The joint line connection features 632, 630 have the added benefit of including a sharp corner in the joint line 612, thereby minimizing flashing along the joint line 612 as described above.

Alternate configurations combining two or more of the above illustrated examples can similarly be utilized depending on the design constraints and specific geometries of a particular die casting assembly. It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A die casting assembly comprising:
    a cavity defined by a plurality of dies, said cavity including a plurality of sharp corners;
    each of said dies including a plurality of die segments, each of said die segments contacting at least one other of said plurality of die segments; and
    a plurality of die segment joints, each of said die segment joints aligned with at least one of said sharp corners.

2. The die casting assembly of claim 1, wherein at least one of said plurality of die segments is constructed of a material selected from a group of a steel, superalloy, refractory metal and ceramic material.

3. The die casting assembly of claim 1, wherein at least one of said plurality of die segments is at least partially coated via a pack cementation or plasma vapor deposition process.

4. The die casting assembly of claim 1, wherein at least one of said die segments is maintained in position in said die via a pair of opposing spring features.

5. The die casting assembly of claim 1, wherein at least one of said die segments is maintained in position in a housing at least partially surrounding said plurality of die segments.

6. The die casting assembly of claim 1, wherein each of said plurality of die segments includes a connector corresponding to each contacting die segment, and each of said connectors is interfaced with a corresponding connector of a contacting die segment.

7. The die casting assembly of claim 1, wherein a joint connecting a first die segment and a second die segment comprises a sharp corner.

8. A die comprising:
    a plurality of die segments, each of said die segments contacting at least one other of said plurality of die segments; and
    a partial die cavity defined by said die segments, wherein said partial die cavity includes a plurality of sharp corners;
    a plurality of die segment joints between at least two of said die segments, each of said die segment joints aligned with at least one of said sharp corners.

9. The die of claim 8, wherein said at least one sharp corner includes at least two sharp corners, and wherein at least one half of said sharp corners are aligned with at least one die segment joint.

10. The die of claim 8, wherein at least one of said die segment joints includes a corner spaced apart from said die cavity.

11. The die of claim 8, wherein each of said plurality of die segments is constructed of a material selected from a group of steel, superalloy, refractory metal and ceramic material.

12. The die of claim 8, wherein each of said plurality of die segments is at least partially coated via a pack cementation or plasma vapor deposition process.

13. The die of claim 8, wherein each of said die segments is maintained in position in said die via a pair of opposing spring features.

14. The die of claim 8, wherein each of said die segments is maintained in position in a housing at least partially surrounding said plurality of die segments.

15. The die of claim 8, wherein each of said plurality of die segments includes a connector corresponding to each contacting die segment, and each of said connectors is interfaced with a corresponding connector of a contacting die segment.

16. The die of claim 8, wherein each of said at least one sharp corner is a corner having an angle of less than or equal to 110 degrees.

\* \* \* \* \*